(12) United States Patent
Spremo et al.

(10) Patent No.: US 12,404,951 B1
(45) Date of Patent: Sep. 2, 2025

(54) MICROFLUIDICS PRESSURE-BASED SWITCHING AND VALVING ARRAY

(71) Applicant: United States of America as Represented by the Administrator of NASA, Washington, DC (US)

(72) Inventors: Stevan Michael Spremo, Campbell, CA (US); Michael Ryan Padgen, Oakland, CA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 625 days.

(21) Appl. No.: 17/653,871

(22) Filed: Mar. 7, 2022

(51) Int. Cl.
*F16K 99/00* (2006.01)
*B01L 3/00* (2006.01)

(52) U.S. Cl.
CPC .... *F16K 99/0028* (2013.01); *B01L 3/502738* (2013.01); *F16K 99/0015* (2013.01); *F16K 99/0048* (2013.01); *B01L 2200/027* (2013.01); *B01L 2200/0642* (2013.01); *B01L 2200/0673* (2013.01); *B01L 2300/0816* (2013.01); *B01L 2300/0864* (2013.01); *B01L 2300/14* (2013.01);
(Continued)

(58) Field of Classification Search
CPC ............ F16K 99/0028; F16K 99/0015; F16K 99/0048; F16K 2099/0084; B01L 3/502738; B01L 2200/027; B01L 2200/0642; B01L 2200/0673; B01L 2300/0816; B01L 2300/0864; B01L 2300/14; B01L 2400/0605; B01L 2400/0622; B01L 2400/0638; B01L 2400/0666

USPC .......................................................... 137/12
See application file for complete search history.

(56) References Cited

U.S. PATENT DOCUMENTS

| 1,329,559 A | 2/1920 | Tesla |
| 8,383,043 B2 * | 2/2013 | Padmanabhan .... G01N 15/1459 436/63 |

(Continued)

OTHER PUBLICATIONS

Padgen, Michael R., et al., EcAMSat spaceflight measurements of the role of os in antibiotic resistance of stationary phase *Escherichia coli* in microgravity, Journal Elsevier, Life Sciences in Space Research 24, pp. 18-24, 2020.
(Continued)

*Primary Examiner* — Minh Q Le
(74) *Attorney, Agent, or Firm* — Rhys W. Cheung; Robert M. Padilla; Trenton J. Roche

(57) ABSTRACT

A system and method for advancing a portion of a fluid in a first microfluidics card includes establishing a timed sequence of pressure condition events, each pressure condition event in the sequence creating one or more pressure differentials for either imparting to the portion of the fluid a moving force in which the portion is moved from a first to a second location, or establishing an equilibrium in which a position of the portion remains stationary. In certain embodiments, a fluidics processing unit is described. It includes a microfluidics card having an inlet line, an outlet line, and one or more microchannels in fluid communication with the inlet and outlet lines. It also includes at least one pressure source for driving fluid in the inlet and outlet lines, and a controller for actuating the at least one pressure source in a timed sequence of steps to selectively advance at least a portion of the fluid to one or more targeted locations through the microchannels.

24 Claims, 14 Drawing Sheets

(52) U.S. Cl.
CPC .................. *B01L 2400/0605* (2013.01); *B01L 2400/0622* (2013.01); *B01L 2400/0638* (2013.01); *B01L 2400/0666* (2013.01); *F16K 2099/0084* (2013.01)

(56) References Cited

U.S. PATENT DOCUMENTS

| | | | |
|---|---|---|---|
| 2001/0055812 A1* | 12/2001 | Mian | B01L 3/502738 422/67 |
| 2003/0034306 A1* | 2/2003 | Schulte | F16K 99/0017 422/534 |
| 2004/0206408 A1* | 10/2004 | Peters | F16K 99/0028 137/825 |
| 2008/0216898 A1* | 9/2008 | Grant | A61M 1/15625 137/154 |
| 2008/0223721 A1* | 9/2008 | Cohen | F16K 99/0026 204/601 |
| 2009/0139577 A1* | 6/2009 | Bohm | F04B 53/10 137/12 |
| 2011/0301535 A1* | 12/2011 | Takayama | F16K 99/0015 604/93.01 |
| 2016/0318019 A1* | 11/2016 | Ledden | B01L 3/502715 |
| 2017/0259267 A1* | 9/2017 | Kim | F04B 43/12 |
| 2018/0369813 A1* | 12/2018 | Delamarche | F16K 99/0034 |
| 2021/0199211 A1* | 7/2021 | Zhang | F16K 7/10 |
| 2021/0260583 A1* | 8/2021 | Nguyen-Demary | B01L 3/502738 |
| 2023/0191402 A1* | 6/2023 | Zhao | B01F 25/432 422/504 |

OTHER PUBLICATIONS

Nicholson, W. L.; et al. (Dec. 11, 2011). "The O/OREOS mission: first science data from the Space Environment Survivability of Living Organisms (SESLO) payload". Astrobiology. 11 (10): 951-8.

* cited by examiner

FIG. 14

MICROFLUIDICS PRESSURE-BASED SWITCHING AND VALVING ARRAY

ORIGIN OF THE INVENTION

The invention described herein was made by (an) employee(s) of the United States Government and may be manufactured and used by or for the Government of the United States of America for governmental purposes without the payment of any royalties thereon or therefor.

BACKGROUND OF THE INVENTION

At NASA Ames there have been several microfluidic systems designed, built and flown to space. These systems allow experiments in which a first material is introduced into a well containing a second material and the interaction of the two materials is observed and measured. Further experimental steps and procedures required human intervention and were often difficult to conduct in space.

For understanding the complex interactions of biological organisms in microgravity or deep space environments, one-off experiments like EcAMSat (see "*EcAMSat spaceflight measurements of the role of σs in antibiotic resistance of stationary phase Escherichia coli in microgravity*," Padgen et al., Life Sciences in Space Research 24, (2020) 18-24, incorporated herein by reference in its entirety), while important, have limitations. Essentially, the measurements reflect the state of the organism at a specific time point, and do not necessarily capture the cumulative effects that these harsh environments can cause over time.

Even experiments like SESLO on O/OREOS, which grew the microorganisms at different time points, do not necessarily achieve this either because the organisms were kept in stasis prior to activation.

SUMMARY OF THE INVENTION

In the past, the contents of experimental wells (e.g., bacterial cells) were constrained by filter barriers. While fluids could be exchanged, autonomously transferring the contents to neighboring experiment wells was not possible. The technology advancement described herein enable a new way of using a microfluidics cards to autonomously transfer a well content from one well to the next when previously it would require full mechanical assembly with a human in the loop. In certain embodiments, systems and methods described herein allow this function to happen by way of robotic programmed pressure logic sequencing.

Being able to selectively constrain or move biological specimens in experimental fluidic wells allows for serial passaging of the biology, in which a sample from well i is delivered to well i+1 with fresh media. If it takes m generations to for the biology to consume the media in each well, having n wells means that m*n generations can be studied, with each set of m generations able to be analyzed separately. This can reveal subtle genetic or phenotypic changes in the biology over longer periods of time than currently possible. While this type of experiment was the initiating problem, this technology would not be limited to this sort of experiment.

In certain embodiments, improvements are realized by accommodating pressure-based actuation of valving sequences that can allow one well or chamber to expel its contents to a neighboring chamber, imparting the ability to foster time dependent step-wise method of chemical reactions or start new generations of biological population growth, among other experimental possibilities. Aspects of time-dependent mixing or inhibiting or exciting flow from one well to another are encompassed by many elements of this invention. Upgrading materials in accordance with certain embodiments to hold higher pressures than previous iterations were able to handle enables new capabilities. These technologies have applicability in commercial industry as well and are recommended to be of an inert nature.

Embodiments include a method for transporting fluid from one chamber to an adjacent chamber by utilizing methods of valve array actuation through a number of valvular configurations in a two way or three way configuration, or combinations of these. In certain embodiments, the valvular configurations induce a pressure delta in different combinatoric actions. Other delta pressure methods of actuating the array are also applicable.

Some embodiments include a method of applying a pressure gradient and uniform static pressure changes to the described system by way of a top and bottom parallel/series static pressure valvular conduit switching a cracking pressure of the valve or ration of flow in the microfluidics array by modulating the amplitude and directionality of the pressure gradient in a parallel path with static pressure taps along the series valvular conduit features in concert with other valvular conduits. In certain embodiments, the described actions are taken with respect to time in either synchronous or asynchronous iterations.

BRIEF DESCRIPTION OF THE DRAWINGS

FIG. 14 is a 3 bit logic state diagram showing basic operation combinations to achieve pressure deltas across a microchannel card to achieve a repeatable influence on the well chambers to push and pull fluid from the chambers in accordance with certain embodiments.

DETAILED DESCRIPTION

Figure 1:
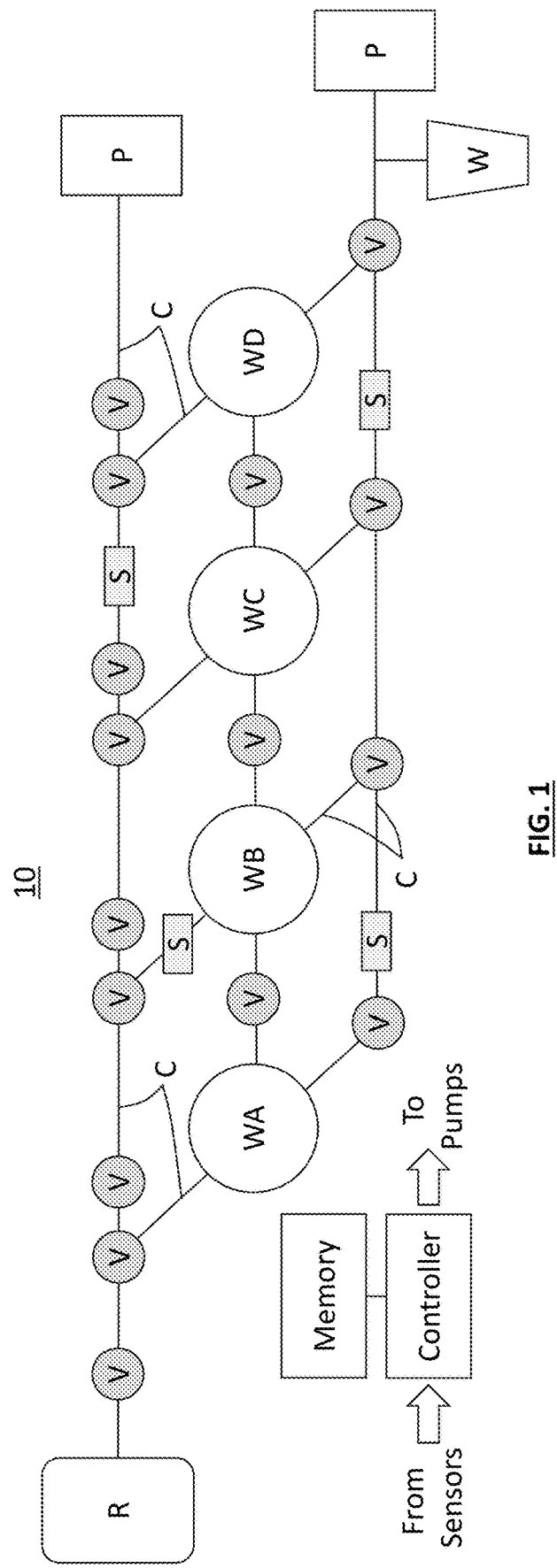
FIG. 1 is a block diagram showing an example four-chamber microfluidics pressure-based switching and valving system 10 according to certain embodiments.

The methods and design required to achieve this design are new and novel compared to the previous state of the art, in which all biological samples were constrained within individual wells. In certain embodiments, microfluidic channels that connect neighboring wells are provided. The transfer to the next well or containment in a well is determined through pressure-based actuation of sealing features that function like valves.

In certain embodiments, the system acts as a microfluidics switch array analogous to how electronics switching enables or inhibits current flow in FET's to achieve a specified logic state. Operationally, individual valving may be compared to how the Mitrial, Aortic, and Pulmonary valves operate in the heart. Instead of muscle function in the heart causing the pressure deltas, support systems (including but not limited to pumps or pistons) actuate a sequence of pressure conditions in various microfluidics card chambers to open and close the specific valves to determine the direction of flow. Through different combinations of applied pressure addressed to specific valves, it would be possible to shuttle samples through n number of chambers per specific experiment protocol. The array of addressable valves allows for realtime reconfiguration of the experiment for the mixing of chemicals and/or biological specimens. Inhibiting or exciting the flow or mixing combinations to a target chamber may be achieved with a construct of one-way physical valves or, absent valves, through a series of steps inhibiting or actuating flow in multiple channels through synchronous or asynchronous pressure delta changes or a fractional chamber combinatoric patterns across the array. In certain embodiments, this function is achieved by addressing fluid flow directionality by use of a controller such as a CPU.

One advantage of the design is that it minimizes the number of large solenoid valves needed to achieve results and ultimately further miniaturizes microfluidics multi-step systems. It also allows for a programmable sequence of sample movements to occur in an experiment, while in previous iterations samples were localized to individual wells. This design supports a variety of generational biological experiment possibilities in which one generation can be passed to a neighboring chamber and experience as desired different sets of experiment conditions due to chemical mixing, radiation exposure, photochemistry and photobiology etc.

In this manner microfluidics cards are able to conduct multistep processes in which individual wells are not isolated and can be combined at defined experiment time points actively when desired in the microfluidics card.

The design in accordance with certain embodiments is an improvement over existing designs, for example, upgrading materials to hold higher pressures and accommodating valving sequences that can allow one chamber to expel its contents to a neighboring chamber to foster a chemical reaction or start a new generation of biological growth population. The methods and design required to achieve this design is new and novel compared to previous state of the art, where for example a sample was constrained to an individual well.

Methods according to certain embodiments utilize a new microfluidics channel that allows passage or containment of materials in a well by way of applying pressure to an auxiliary port that allows the flow of material for example from chamber A to chamber B or chamber n, or restrict flow to chamber B or chamber n by adding pressure to a directional check valve or sandwiched membrane which accepts or restricts flow. Material may be able to shuttle through n number of chambers for a specific experimental protocol creating a multi-generation biological experiment or a multi-step chemical reaction.

In certain embodiments, the microfluidic card design uses pressure based-actuation of an addressable array of sealing features to transfer samples from one well to another in a stepwise fashion. During each step, one or more tasks can be performed. To handle the pressure for switching, the main components of the fluidic card body are made from glass and/or an appropriately biocompatible metal. The application of pressure comes from an automated external support system, which may include but is not limited to fluid and/or air pumps or pistons. In certain embodiments, multiple sources of pressure may be required to execute the actuation sequences.

In certain embodiments, each well is assigned at least one sealing feature for both the inlet and outlet of the well. When necessary, appropriately sized filters are provided to help constrain the biology within the well, for example when cells are involved. Sealing features may be used to control the flow path, for filling the well, performing fluid exchanges when needed, and moving samples to neighboring wells. Each envisioned process can be programmable and automated, and may require only the adequate application of pressure to the selected feature or features. The configuration of the card may consist of m rows of n wells, for m*n total experimental wells. Depending on the application, each row can be independent or interconnected. The size and number of wells can depend on experimental protocol requirements.

Methods for addressing specific valves include but are not limited to tailoring the characteristic pressures at which the sealing features open or close. If the valves on an inlet side close at different pressures, flow can be directed to a specific well by closing only specific valves, leaving others open. On the outlet, having the channel to a waste bag have a normally lower pressure than the channel to the neighboring well would direct flow to the waste bag. But by adding pressure, via pump or other mechanism, to the exit channel, flow would be forced into the channel to the neighboring cell. This process could be repeated stepwise to move samples from one well to the next. The pressure can be relieved when not actively directing flow. Other methods do not require mechanical open/close actions, but rather include pressure delta generation.

Unique features include utilizing a microfluidics card that can experience multiple different pressure levels within the card through a number of pressure valving ports that actuate in a sequence defined by the need to open and close valves at particular time points to foster a chemical reaction or delivering of biologic specimen to a new location. A pressure sequence that allows for a logic-based switching of valves to achieve this function can be implemented with a variable of time as well and dynamic configuration is unique and novel.

A method of altering the fluid flow to transfer a microfluidic chamber content from one chamber to another by way of logic-based fluid flow sequencing steps and furthermore allowing a new method of addressable transport of fluidic or matter through a microfluidics array to achieve biological growth, chemical reactions, nutrient delivery, etc. is provided in accordance with certain embodiments.

FIG. 1 is a block diagram showing an example four-chamber microfluidics pressure-based switching and valving system 10 according to certain embodiments. As illustrated, the system comprises a fluid circuit in which four wells WA-WD are in controllable fluid communication with one another by way of microfluid channels or conduits C. In certain embodiments, they are also in communication with a fluid reservoir R and a waste receptacle W by way of the microfluid channels or conduits C. A number of pressure-actuated valves V provide the flow control, permitting or inhibiting flow as needed. The valves V may also be referred to as switches, and can comprise any type of device that controllably permits or prevents fluid flow, uni- or bi-directionally. In certain embodiments, some or all the valves V are normally closed valves that open when a prescribed pressure (forward or back) is applied, and these may be referred to for convenience as low pass valves. In certain embodiments, some or all the valves V are normally open valves that close when a prescribed pressure (forward or back) is applied, and these may be referred to for convenience as check valves.

It is to be understood that the microfluid channels C are not necessarily straight as portrayed, and the number of channels communicating with each well is not limited to that shown but can vary depending on the application, location of the wells, etc. Further, the number of valves V associated with each channel or associated with each well or conduit can vary depending on the application or location, etc., and a different number of valves than that shown can be employed. In certain embodiments, some or all of the valves may be dispensed with, and material moved based on pressure differences created in different portions of the fluid circuit. Thus some locations in the diagram where valves V are shown may simply be null locations with no valves at all. The number of wells WA-WD can also vary from the four shown depending on the experiment protocol, number of experiments, and other design parameters.

Only one fluid reservoir R is shown in FIG. 1, although a different number of such reservoirs at different locations in the circuit can be deployed. The reservoir R provides the material, in fluidic form, for conducting biologic, chemical, or other reactions in the wells WA-WD by reacting or otherwise interacting with the contents of the wells. The reservoir R, as well as the receptacle W, can further provide a source of controllable positive or negative pressure for interaction with other pressures in the system for driving fluid to various destinations. The well contents may differ from well to well. Examples of the reservoir material that is selectively directed into the wells include, but are not limited to, a stasis buffer, growth medium, antibiotic, and alamar-Blue, which is a metabolic indicator dye that changes colors due to cell metabolism.

Also shown in FIG. 1 are pressure sources P which can be pumps or pistons to selectively push (forward pressure) or retract (back pressure) the fluid in the circuit, which fluid can be housed or circulated through the pump or piston or the like. In certain embodiments, a pump or piston can be integral with the fluid reservoir, dispensing with the need for separate reservoir R. In certain embodiments, a pump or piston can be integral with the waste receptacle, dispensing with the need for separate receptacle W.

In certain embodiments, a separate air or other fluid circuit can be provided to communicate the force or pressure required to actuate the valves V, as further detailed below. Valves in such a dual circuit arrangement can be considered three way valves, compared with those in the single-circuit arrangement described above, which can be considered two-way valves. In a dual circuit configuration, the two fluids can be different from one another—for example one fluid can be the media that is active in the experiment as described above and that is to be controllably directed into the wells WA-WD for interaction with the well contents, while the other fluid can be hermetically isolated from that media, taking the form of air, oil, water or the like, and merely serving to transmit the required pressure forces to open or close the valves V for directing the fluid in the channels C.

Operation of the pumps P is controlled by signals from a controller which determine the amount and direction (forward or back) of the pressure applied by the pumps according to programmable logic executed by the controller, which may comprise a CPU, microcontroller, FPGA or logic gate array or the like. This logic may be stored in a memory as shown as a set of executable instructions. The system can be provided with other supporting hardware and circuit modules, for example a power supply, communication interface, and the like—all of which are omitted from the drawing for the sake of clarity only. Sensors S provide pressure measurements along the circuit to assist the controller in its operation. Only four sensors S are shown for clarity, but it should be understood that any number greater than or less than four can be used, at any location in the fluid circuit from which sensor feedback may be useful. The pumps can be operated to apply pressure at different desired speeds—for example substantially instantaneously in discrete ON or OFF states, more slowly in essentially an "analog" manner.

In accordance with some embodiments, at least some portions of the microfluidics pressure-based switching and valving array of FIG. 1 can be contained in a microfluidics card that is configured and constructed to handle the pressures required.

Figure 2:
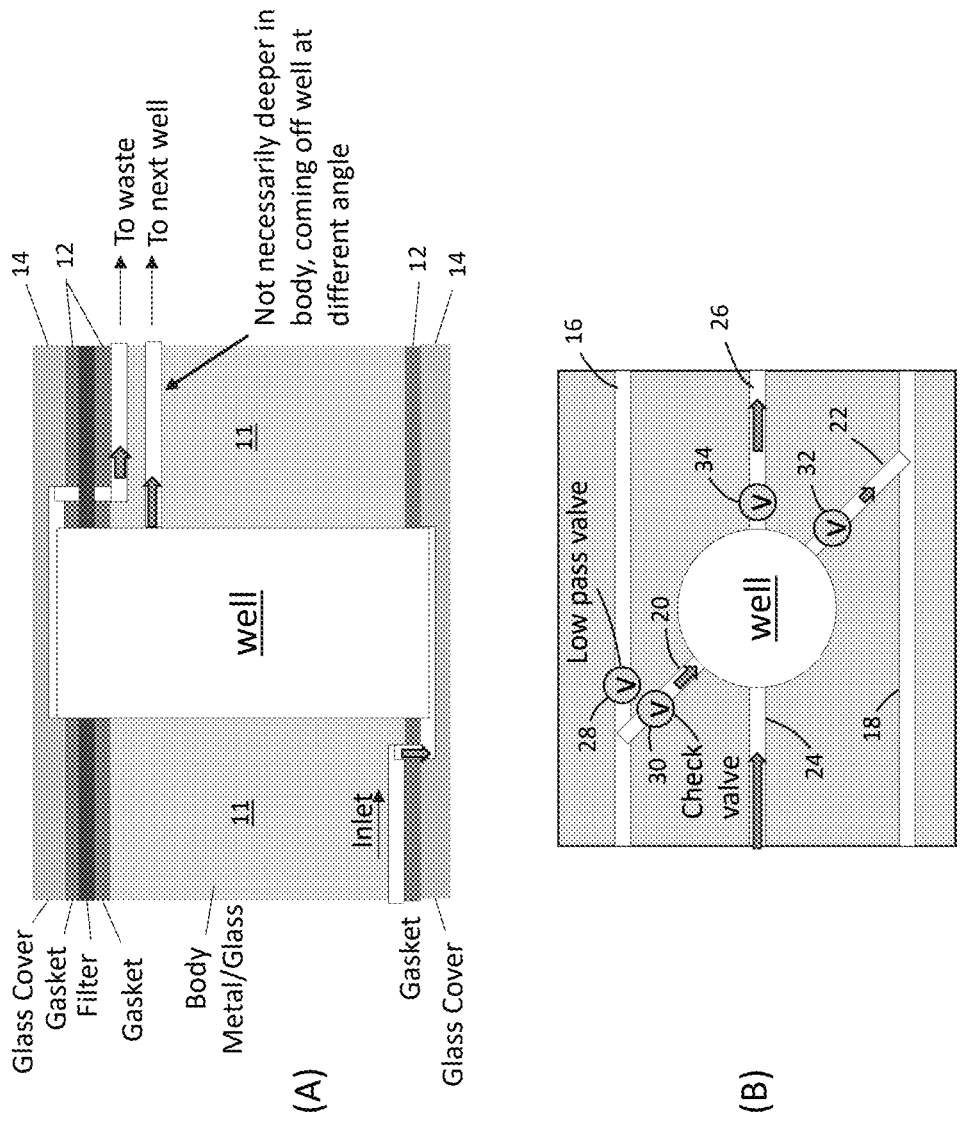
FIG. 2 is a block diagram showing an example of a well constructed in a microfluidics card in an elevational cross-section view (A) and plan cross-section view (B) in a two-way valve configuration, according to certain embodiments.

FIG. 2 is a block diagram showing an example of a well such as any of wells WA-WD constructed in a microfluidics card in an elevational cross-section view (A) and plan cross-section view (B) in a two-way valve configuration, according to certain embodiments. In certain embodiments, the card can include a substrate 11 in which the well is formed, as well as two or more gasket layers 12, all sandwiched between two glass cover layers 14. The substrate 11 or body material can be metal or glass in certain embodiments, and like any of the components intended to contact the contents of the well and channels, is selected to be compatible and non-reactive with said contents. FIG. 2 also depicts the a common inlet channel or inlet line 16, common outlet channel or outlet line 18, well inlet channel 20, well outlet channel 22, interchannel well inlet 24, and interchannel well outlet 26. In the common inlet channel 16 a valve 28, which may be a low pass valve, is depicted. Another valve 30, which may be a one way valve or a check valve, is shown in well inlet channel 20. When the pressure of the fluid reaches the opening pressure of the valve 30, flow will be directed to the well. On the outlet side are two valves which may be check valves: a low cracking pressure valve 32 that leads to the outlet channel 22, and another higher cracking pressure valve 34 that leads to a neighboring well (not shown).

Figure 3:
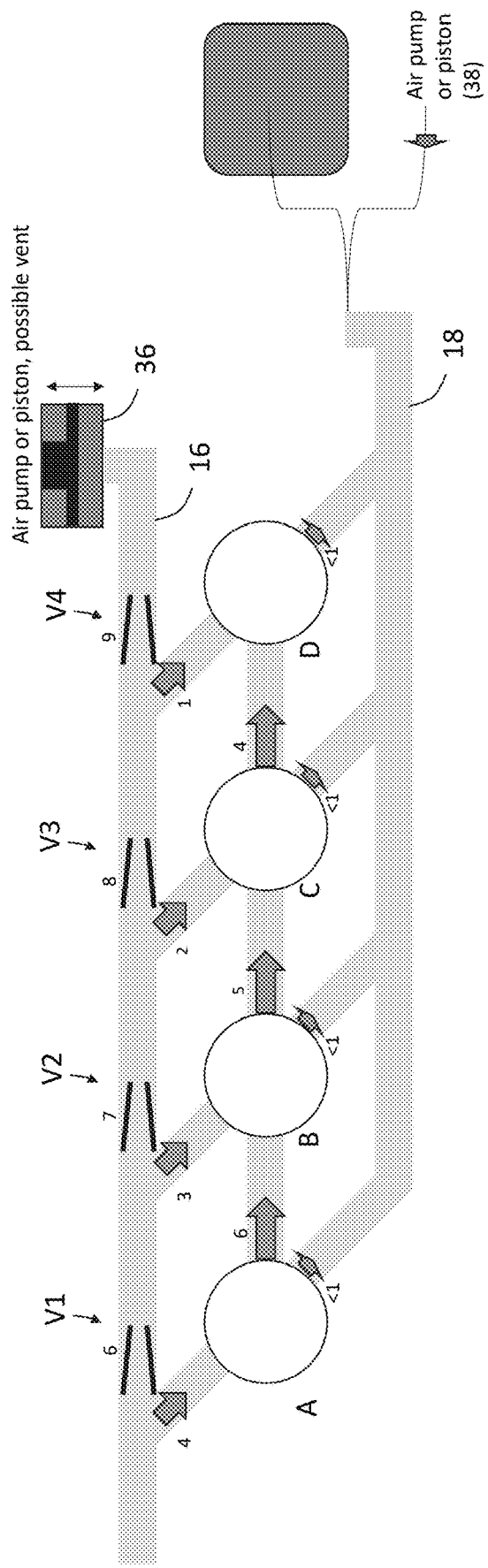
FIG. 3 is a block diagram illustrating an example of a four-well array in which fluid flow into and out of each well is gated by controllably operating pressure-actuated valves in accordance with certain embodiments.

FIG. 3 is a block diagram illustrating an example of a four-well array in which fluid flow into and out of each well is gated by controllably operating pressure-actuated valves. These valves include upstream valves V1-V4 for controlling fluid flow in common inlet line 16, using a pressure source such as an air pump or piston or other device 36 operative to drive fluid in the inlet line and build or ease pressure as desired. The numbers near each valve V1-V4 are relative representations of pressures at which the valves' resistance is overcome and the valves open to permit fluid flow, and in that sense the valves may be considered low pass valves. These numbers may correspond to actual psi values, but this is not necessarily so. Considering valve V1, it has the relative number of 6, while valve V2 has the relative number of 7. A relative pressure amount 6 (for example psi) in inlet line 16 can open valve V1 to permit fluid flow therethrough, but will not be sufficient to open valve V2 (or V3-V4). A pressure amount of 7 (for example psi) can open valves V1 and V2, but will not be sufficient to open valves V3 and V4, and so on. The valves V1-V4 are disposed in the fluid flow path in inlet line 16, which is in fluid communication with a pump, piston, or other device 36 for providing pressure into the common inlet line. Pressure in the downstream conduit (common outlet channel or outlet line 18) is controlled separately through an air pump, piston, vent, or other device 38. As explained above, in this arrangement, the numbers next to the valves represent the relative pressure required to open (check valves) or close (low pass) the valves.

FIGS. 4-7 illustrate an example process for controlling flow of fluids through a four-well array in accordance with certain embodiments. The steps include priming the inlet line, filling well A, moving a sample from well A to well B, and filling well B. The process can be repeated as necessary to fill the remaining wells. This arrangement assumes an upstream fluid pump for delivery of the media and a downstream waste repository for collecting the waste fluid.

Figure 4:
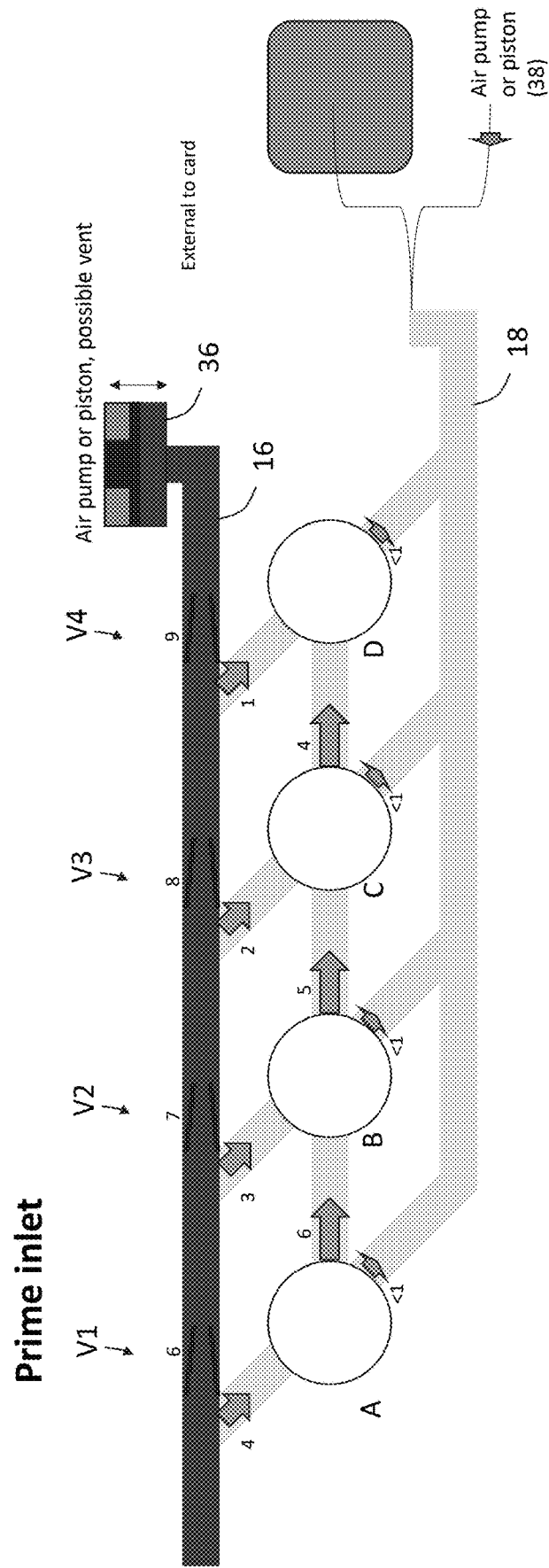
FIGS. 4-7 illustrate an example process for controlling flow of fluids through a four-well array in accordance with certain embodiments.

FIG. 4 is a block diagram illustrating an example of the four-well array shown in FIG. 3, and further illustrating the first stage of controlling the movement of fluid through the four-well array according to one example scenario. Here, FIG. 4 shows the top conduit (common inlet channel or outlet line 16) being primed with low pressure flow up to the location of the pressure source 36. A vent (not shown) allows the air in the channel to be removed, creating a fully wetted out channel 16. The pressure remains low while priming inlet line.

Figure 5:
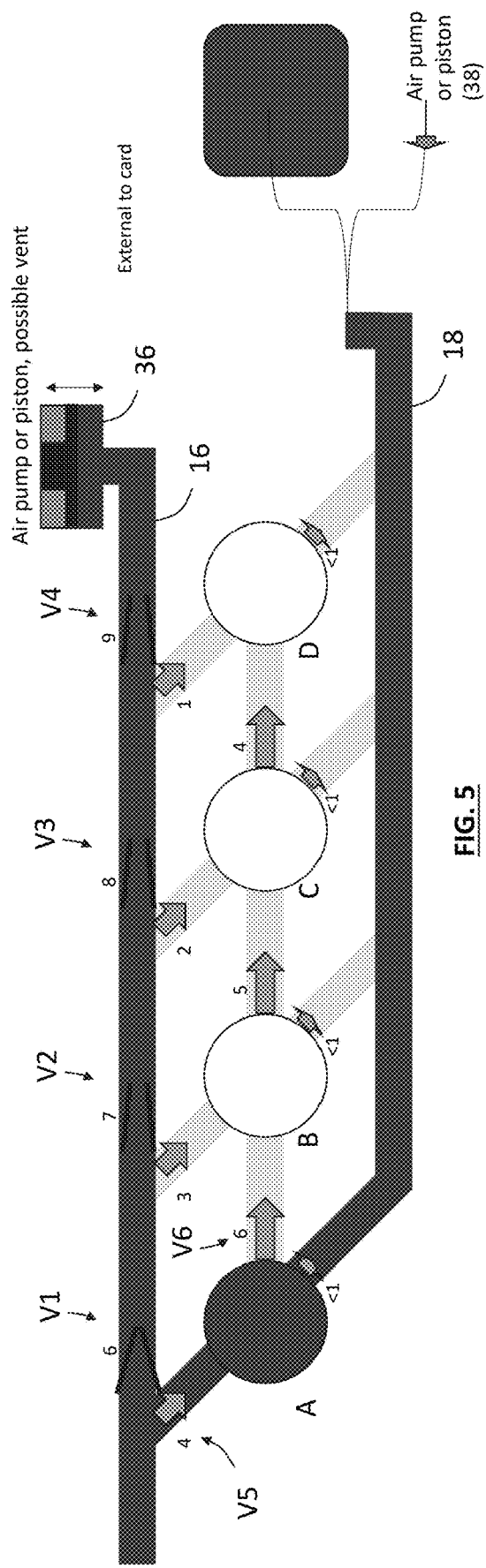

FIG. 5 is a block diagram illustrating an example of the next stage of controlling the movement of fluid through the four well array. Using the air pump, piston or other device 36 to apply sufficient pressure in the inlet channel to close the first low pass valve V1, and using the upstream pump to apply sufficient pressure to the fluid being delivered from reservoir R to crack open check valve V5, flow is directed into Well A. The well is filled and fluid flows out into the waste line.

As illustrated in FIG. 5, the example process includes:
Moving piston or air pump to increase pressure so first valve in inlet channel closes (6 psi)
Building up pressure to crack through 4 psi inlet check valve.
Filling well and go out exit channel
When done filling, releasing pressure in system
(Can do exchanges with same sequence)

Figure 6:
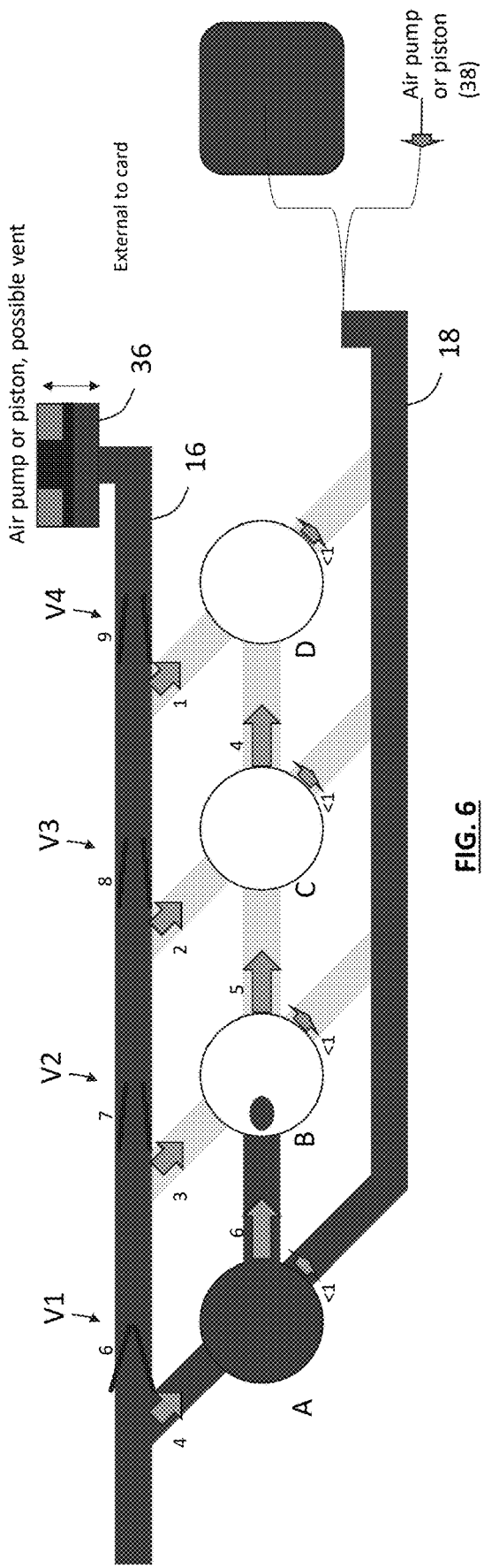

FIG. 6 is a block diagram illustrating an example of moving the fluid from one well to its neighbor. Pressure in the inlet channel 16 directs flow to Well A, and pressure in the outlet channel directs flow through the check valve V6 to deliver a sample from Well A into the neighboring Well B. The pressure levels in each channel are controlled separately, for example through devices 36 and 38, and can be adjusted as necessary.

Figure 7:
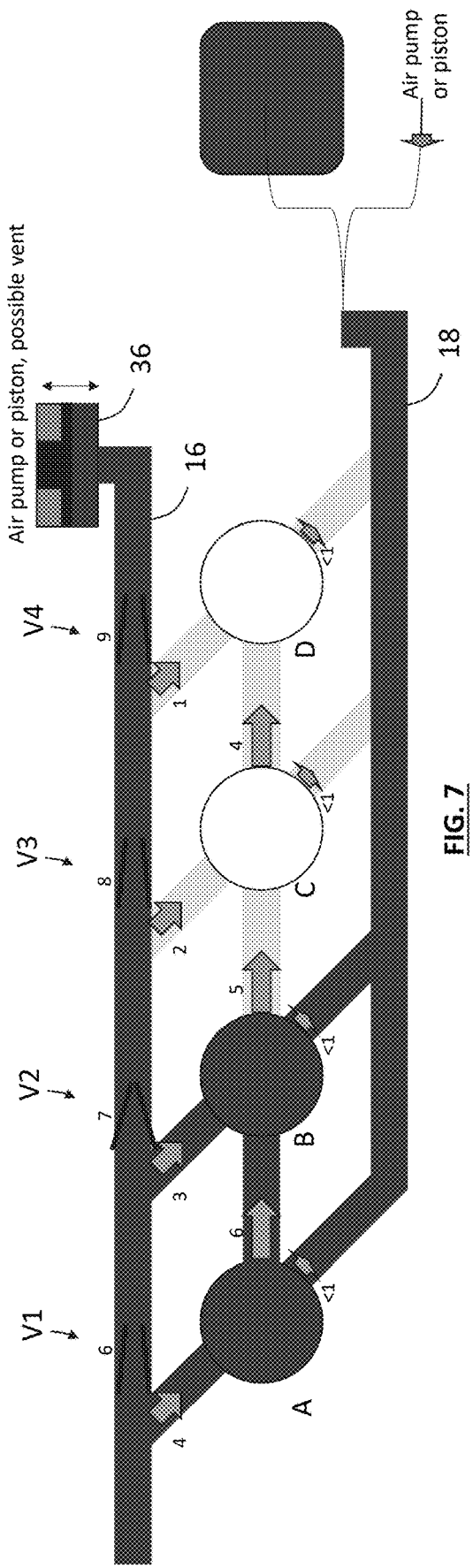

As illustrated in FIG. 6, the example process includes:
Moving piston or air pump to increase pressure so first valve in inlet channel closes (6 psi)
Moving piston or air pump to increase pressure on outlet channel to 10 psi
Building up pressure to crack through 6 psi check valve separating wells for a set amount of time to move small sample into well B
When done filling, releasing pressure in system FIG. 7 is a block diagram illustrating an example of the next stage in the cycle of controlling the movement of fluid. The pressure in the inlet channel 16 is adjusted so that the flow can pass the first low pass valve V1 but not the second V2, directing flow into Well B. The steps in FIG. 6 and FIG. 7 can be repeated as necessary to continue to the multi-stage chemical reaction or biological growth.

As illustrated in FIG. 7, the example process includes:
Moving piston or air pump to increase pressure so second valve in inlet channel closes (7 psi)
Building up pressure to crack through 3 psi inlet check valve.
Filling well and going out exit channel
When done filling, releasing pressure in system
(Can do exchanges with same sequence)

Figure 8:
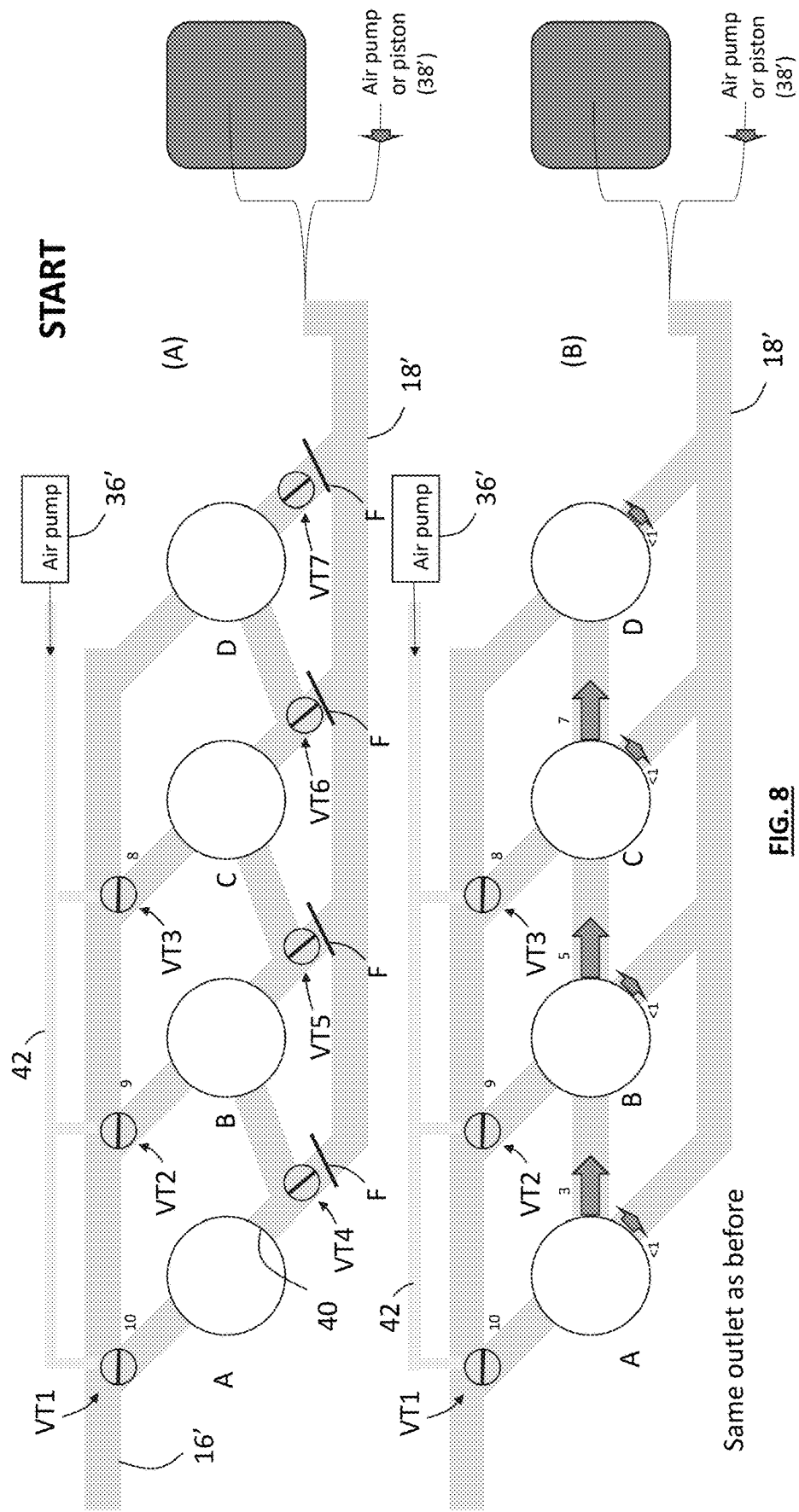
FIG. 8 is a block diagram illustrating a different example configuration of a four well array in accordance with certain embodiments.
Figure 9:
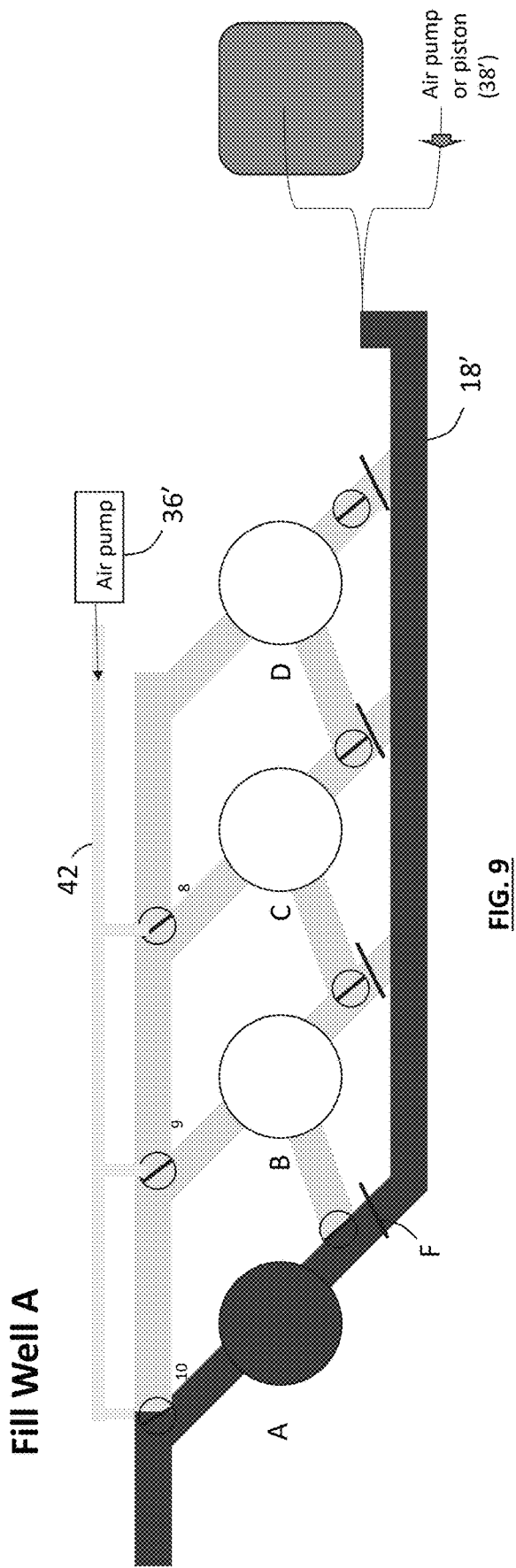
FIG. 9 is a block diagram illustrating an example of the four well array shown in FIG. 8 and further illustrating the first step in controlling the movement of fluid in accordance with certain embodiments.
Figure 10:
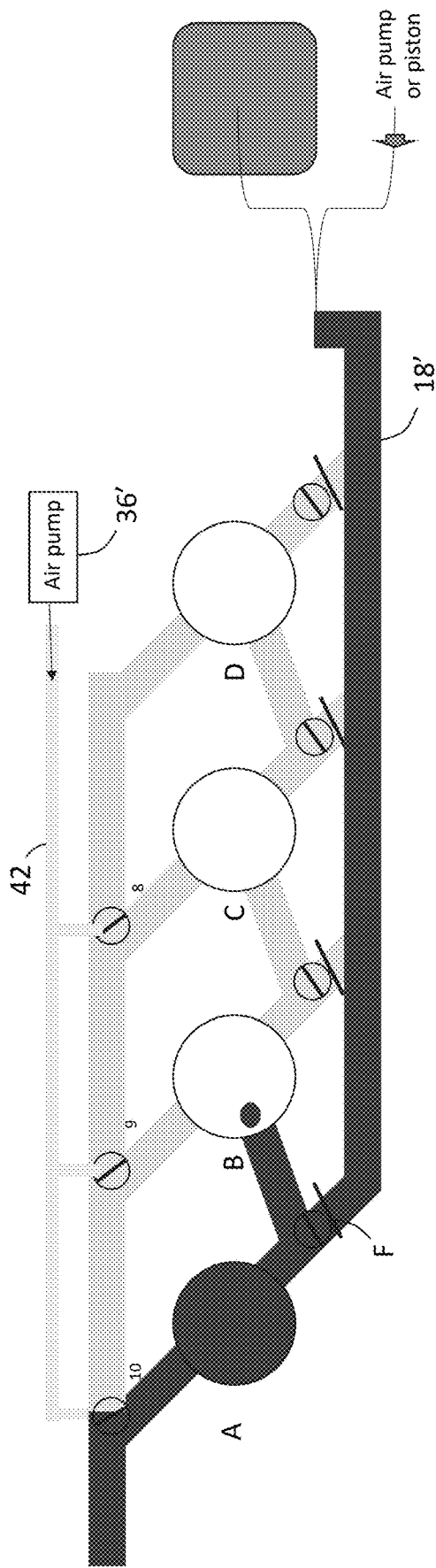
FIG. 10 is a block diagram illustrating an example of the four well array shown in FIG. 8 and further illustrating the next step in controlling the movement of fluid in accordance with certain embodiments.
Figure 11:
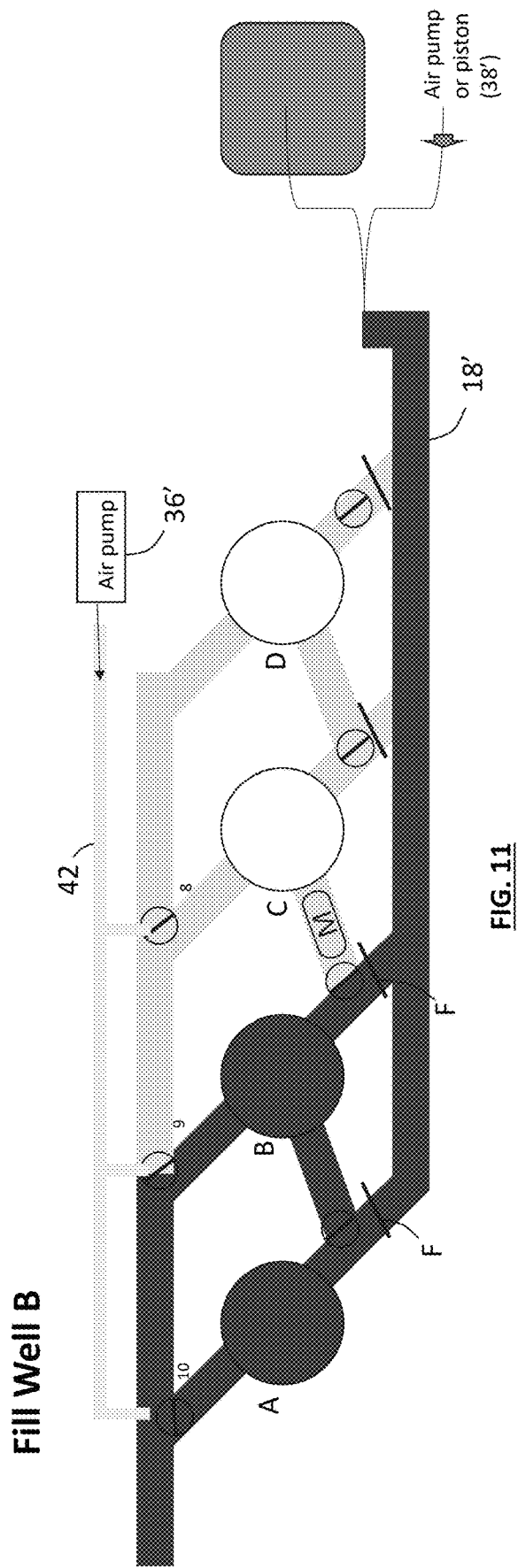
FIG. 11 is a block diagram illustrating an example of the four well array shown in FIG. 8 and further illustrating the next step in controlling the movement of fluid in accordance with certain embodiments.

FIG. 8 is a block diagram illustrating a different example configuration of a four well array with 3 way valves in the inlet channel 16' controlled by pressure applied in an external but interacting separate fluid circuit, for example using air as the actuating medium and an air pump 36' to apply force thereto by way of a common line 42. Other media such as water can be used. The controllable pressure from this separate fluid circuit selectively actuates three-way valves VT1-VT3, which can serve to direct fluid in the primary fluid circuit (the circuit of the media that is active in the experiment as described above and that is to be controllably directed into the wells) in manner of the low pass valves described above. The direction of flow on the outlet side 40 of the well, either to waste or to the next well, is controlled by applying pressure to the fluid in the primary fluid circuit using an air pump, piston or other device 38'. In certain embodiments, this can be accomplished with additional 3 way valves VT4-VT7 (A), or, at (B), with check valves in a similar fashion to the previous example. For clarity the check valves in (B) are omitted, and only the their cracking pressure FIGS. 3, 5, 7, <1) are shown. Thus the cracking pressure numbers next to the well indicate a relative pressure level to switch the position of the valve and redirect flow in the primary circuit. In the standard configuration, flow to the wells is blocked by the valves. FIGS. 9-FIG. 11 demonstrate the steps of filling the first well, transferring fluid to the neighboring well, and filling the next well.

FIG. 9 is a block diagram illustrating an example of the four well array shown in FIG. 8 and further illustrating the first step in controlling the movement of fluid. Pressure applied through the secondary circuit of pump 36' and line 42 directs the flow from an external pump or reservoir (not shown) into Well A, filling Well A and exiting, optionally through a filter F to the outlet channel 18' to waste.

As illustrated in FIG. 9, the example process includes:
Building up pressure in air pump line to turn on all inlet valves (10 psi)
Filling well and going out exit channel
When done filling, releasing pressure in system
(Can do exchanges with same sequence)

FIG. 10 is a block diagram illustrating an example of the four well array shown in FIG. 8 and further illustrating the next step in controlling the movement of fluid. With the same pressure on the inlet channel directing flow to Well A via the secondary circuit, adding pressure in the outlet line 18' through an air pump, piston or other device 38' directs the flow to deliver a sample from Well A into the neighboring Well B.

As illustrated in FIG. 10, the example process includes:
Building up pressure in air pump line to turn on all inlet valves
Applying pressure on outlet channel to flip all outlet valves
Pumping small volume into well B
Removing pressure FIG. 11 is a block diagram illustrating an example of the four well array shown in FIG. 8 and further illustrating the next step in controlling the movement of fluid. The pressure in the secondary circuit in line 42 is reduced to a level that blocks flow in the primary circuit to Well A and instead directs flow to Well B. The well is filled and the fluid flows out through the filter and into waste via outlet line 18'. As with the previous example, these steps can be repeated as necessary to continue to the multi-stage chemical reaction or biological growth.

As illustrated in FIG. 11, the example process includes:
Building up pressure in air pump line to turn on all inlet valves except first (9 psi)
Filling well and go out exit channel
When done filling, releasing pressure in system
(Can do exchanges with same sequence)

The approach described herein allows for the generation of novel experiment protocols for space and ground sequential biology and/or chemistry experiments that are not possible with current microfluidic cards. Generally, the controller can operate in a timed sequence of steps to selectively advance one or more portions of fluid in the card to perform biological/chemical experiments that may involve any combination of mixing of materials or otherwise controlling their interaction or movement, and can effectively operate as a fluidics processing unit, as further detailed below. The drive forces that motivate the fluid flow derive from pressure differentials established passively or actively, through mechanical or chemical means, or combinations of these.

Figure 12:
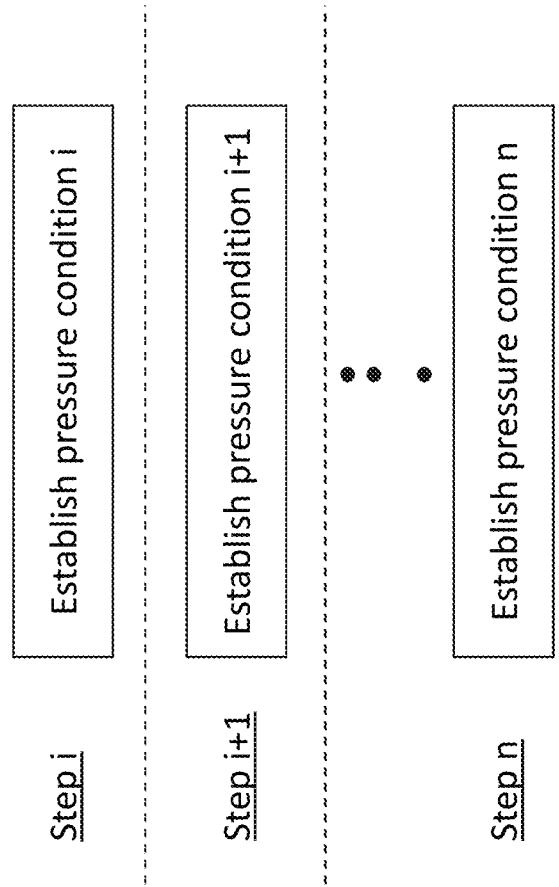
FIG. 12 shows a method for establishing a timed sequence of pressure condition events in accordance with certain embodiments.

In certain embodiments, the system controller (FIG. 1) is programmed to automatically actuate a sequence of pressure conditions in order to execute an experimental protocol that may involve selective transfer of material into an out of wells. The steps taken can be synchronous or asynchronous, and the durations of the chemical or biologic interactions within a well may be individually controllable. That is, the interaction may be run for seconds, minutes, or or hours, and so on. Effectively, and with reference to FIG. 12, in certain embodiments, the system controller executes a method for establishing a timed sequence of pressure condition events, each pressure condition event in the sequence creating one or more pressure differentials for either imparting to the portion of the fluid a moving force in which the portion is moved from a first to a second location, or establishing an equilibrium in which a position of the portion remains stationary. This sequence is stepped through in a synchronous or asynchronous manner, advancing or arresting the motion or the portion of fluid with each step. It is also coordinated with other portions of the fluid, which similarly advance or rest with each step in the sequence depending on the chemical or biologic protocol desired, or the overall logic configuration to be attained as explained below.

In certain embodiments, a time sequenced lipid slug, denoted "M" in FIG. 11, can be provided within a channel that would act as a barrier for limiting diffusion and or mixing. Differing viscosity and hydrophobic or hydrophilic properties can be utilized to promote or inhibit mixing or location of legs within fluid flow channels. In certain embodiments the lipid or other material is moved within a channel to act as a valving flow gate by moving its position with a gate logic and timing element.

Figure 13:
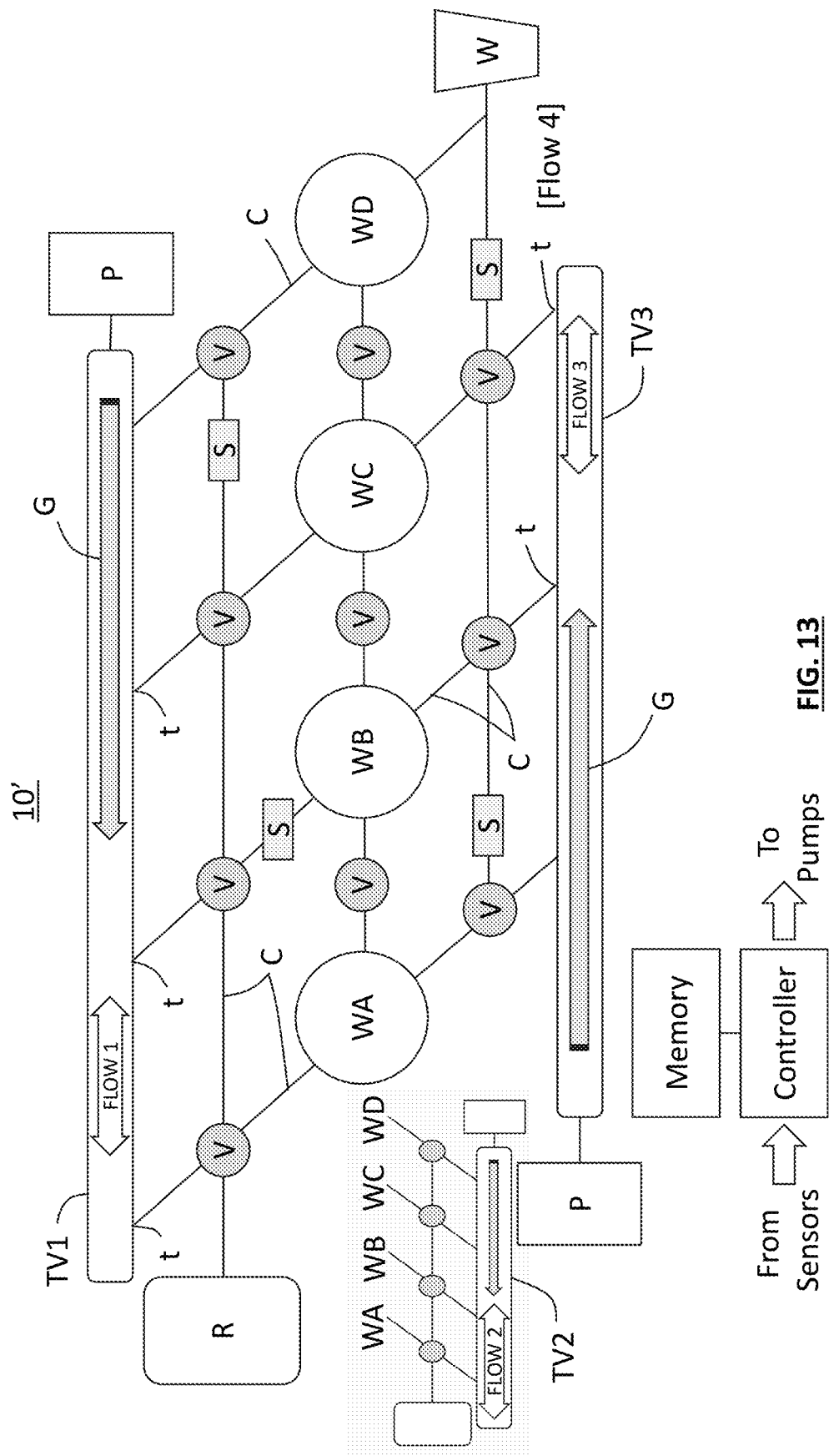
FIG. 13 is a block diagram showing an example four-chamber microfluidics pressure-based switching and valving system 10' according to certain embodiments.

FIG. 13 is a block diagram showing an example four-chamber microfluidics pressure-based switching and valving system 10' according to certain embodiments, in which some of the valves V are replaced by tesla valves TV1 and TV2 that each exhibit a pressure gradient in the direction of the arrow G. In the opposite direction, the tesla valves TV1 and TV2 do not exhibit a pressure gradient, and fluid flow is substantially unimpeded. As a result of the pressure gradient, the different tap points t in fluid communication with the microchannels C deliver fluid flow into the microchannels at pressures that decrease in the direction of the arrows G. The tesla valves may be referred to herein as tesla valvular conduits. Another option for varying the pressure could be to vary the internal diameters of the microchannels C, and combinations of these expedients can be used.

In certain embodiments, a logic-based flow of fluid to achieve controlled transfer of content of a fluid well or chamber by selective logic-driven induced pressure deltas is envisioned. The pressure deltas can be established by selectively driving fluid, for example with a piston or the like, or with a suitably charged plenum, through the tesla valves in either direction. The switching technique may also achieve chamber mixing, intentionally realizing partial or complete mixing of the materials involved. Actions to flush out unwanted materials or introduce cleaning "reset" priming fluids are also envisioned for card reuse. In addition, it is possible to use multiple microfluidics cards and to perform a hand-off, from one card to the next, to sequence chemical or biologic reactions. Hand off of a finalized "processed" sample to a new card, for example with an associated tesla valvular conduit or storage vessel, is also envisioned.

FIG. 13 represents one exemplary embodiment of a switching function but the addition of series and/or parallel path valvular conduits to influence a well state is contemplated. Thus tesla valves can be combined in series, one after the other, to provide additional dimensions of pressure control or more granular control. The wells may comprise a biological construct or may be a chemical construct in which series of time-based synchronous and asynchronous introduction and mixing of chemical molar concentrations may be performed (chemical mixing or voiding). Carefully calibrated design ratioed "tap channels" to sections observing Bernoulli's principle of the tesla valve network may be used to establish pressure influence per unit volume flow-through with related velocity of flow. Influencing factors that may be employed include, but are not limited to, Directionality of flow in a Tesla Valvular Conduit Network such as established by valves like TV1 and TV2, Timing of Flow, Heterogenous Fluid Construct and Homogenous Fluid Construct, and presence or absence of mechanical features (such as a check valve or piston). A computer algorithm software based on these principles is envisioned to design a particular flow pattern resulting in a repeatable exact outcome in a targeted chamber or well through a singular and time sequenced combinatoric set of valvular conduit actuations.

Figure 14:
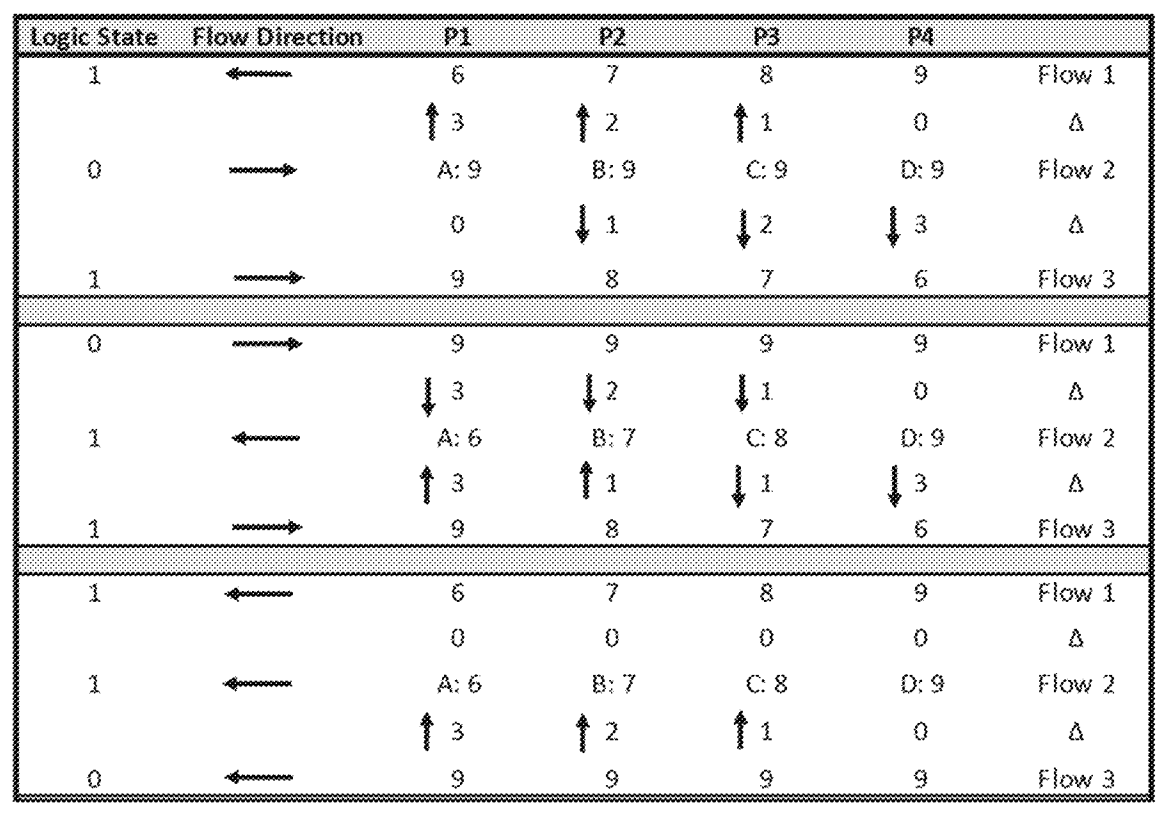

In certain embodiments logic states are assigned to describe flow direction on a tesla valvular conduit. The 3 bit logic state diagram of FIG. 14 shows basic operation combinations to achieve pressure deltas across a microchannel card to achieve a repeatable influence on the well chambers to push and pull fluid from the chambers using the card configuration of FIG. 13, with the corresponding Flows 1-3 labelled accordingly. Flow 2 is shown to the side of the drawing for clarity in FIG. 13, but it is to be understood that it is coupled to the wells WA-WD, and its bidirectional flow is through a gradient oriented similarly to that of Flow 1 in TV1, as the similar gradient arrows depict. The logic states can be expanded upon with variations using additional networks of valvular conduits, wells and channels, and an optional Flow 4, as well as other flows, are possible but omitted for simplicity.

In certain embodiments, involvement of a hybridized fully primed fluid chamber construct can affect a targeted fluid volume(s) by pushing and pulling liquids of varying construct (lipid, different viscosity, polar affinity etc). Pushing a lipid slug into a chamber to block/inhibit mixing and removing it in another time step action of the valvular array concert, allowing selective passage of a intended material is envisioned. In certain embodiments, such fluid channel configurations are primed during a baseline configuration. In certain embodiments simultaneous switching by fluid flow timing in multiple conduits as they interact with a mutually targeted set of one or more chambers in a microfluidic card well array is envisioned.

Constructing logic mapping of inhibiting and allowing an iterative "fluid switching" scheme to occur is envisioned as shown in FIG. 14. In certain embodiments, software to automate the sequence of fluid flow events to achieve a downstream combination flushing (full or partial expelling) of well contents is used. Multigenerational biological experiments are envisioned in which a portion of the previous population is delivered to a new well with a different set of chemical conditions applied and measured to existing bio-sensory approaches. As a conventional electronic microprocessor pushes and pulls logic states in a memory logic array to achieve a mathematical output, an analogy can be made to the instant system as it uses a controller in achieving fluid computational logic of a similar principal to achieve end state chemical construct. The unique microfluidics array with the valvular conduit feature with tap channels as described herein may be referred to as a "Fluidics Processing Unit". As mentioned above, expedients in which its action can be induced include variables such as pressure deltas, liquid polar affinity, viscosity, thermal condition and density conditions, etc. As will be appreciated, the velocity of flow with flow direction is a dynamic aspect of the pressure characteristic achieved along the construct of the tesla valve.

Certain considerations include the number of tesla valves that may be employed with variable valvular array segments (longer or shorter) with a variable number of chamber switch elements and number of actional transfer or mixing steps. Fluid channel volume and cross sectional area rationing can be used as a variable of adjustment in design including "tap channels". Other variables available to those skilled in the art for controlling and behavior and operation of the microfluidics systems include the number of chemical or biological constructs, use of dissimilar fluids at pressure delta interfaces with relations to ratio of fluid chambers involved, number of repeated segments of the tesla valve(s), alignment of coparallel chamber features, reverse mirroring fluid flow direction, offset segment chambers. Time state changes vs. logic state changes can be denoted and characterized algorithmically for example with variables such as t and t' respectively.

In certain embodiments, a tesla valvular array is modified to create "tap channels" to allow pressure action to occur on a featured well. A tap channel can be sized for cross section area and velocity characteristics per Bernoulli principles communicating between the tesla valvular array side channel wall at a subset or all segments based on design need. In certain embodiments, a tap channel is the pressure actuation feature that will draw fluid from or push new fluid into a target chamber.

In certain embodiments, a nested grouping of tesla valvular arrays can be tapped to achieve a rail or higher pressure or lower pressure rail (in a series or parallel function) to a permanent assigned fluidic channel and a global tap channel that ties into all wells. Gradient pressure features of across the well can be controlled with the logic philosophy described in the diagram.

In certain embodiments, tesla valvular array offsetting with selected tap channels can be used, in which "tap channel" from parallel tesla valves with common fluid flow are deployed. In this manner, the inventive design can perform molar dilution or titration, based on time and fluid velocity deltas. In certain embodiments, the tesla valvular arrays used can be equally aligned rather than offset from one another, or a combination of these expedients can be employed.

In certain embodiments, Bernoulli's Principle is employed in the combinatoric state involving the state of the tesla valvular conduit with logic applied, resulting in a repeatable outcome if a sequence of identical steps are repeated. In this manner a method for providing automated fluid combinations by using principles of conservation of energy in the motion of a fluid is realized in accordance with certain embodiments.

A useful analogy is a city with traffic lights and freeways weaving through or railway system. There are a number of combinatoric methods to achieve moving a vehicle from point a and b. The fluidic card with tesla valvular array network in accordance with certain embodiments provides the "roadway" to move a specimen throughout the card or "park" it somewhere. Virtually endless tesla valvular array constructs can be employed, similar to a network of interactive train tracks adding or deleting cars at each rail junction or partially offloading cargo and combining it elsewhere selectively as time goes on.

In certain embodiments, applications of several varied switching states can be defined by the need in the chemistry or life sciences disciplines. In certain embodiments, a sample(s) in a well may be assigned to a particular well and permanently fixed to that location, and mixtures of fluid constructs are delivered to it at a targeted well. In certain embodiments a targeted sample is made mobile and is addressed and directed within the card over the life cycle of its reactions.

In certain embodiments, the tesla valvular conduits can be tuned, using the tap channels themselves, which are selectively addressed and for flow or no-flow, or limited flow, thereby influencing segments of the gradient across the valvular conduit. An onology is to playing different musical notes on a wind instrument and achieving different notes but in this case it would be associated with a delta pressure effect influencing on multiple targeted wells at once influencing flow patterns. This is conducted in concert with other synchronized tesla valvular tap channel combinatorics driven by logic and results in numerous possible pressure delta fluid flow patterns in the card. In certain embodiments the tap channel(s) t could be also driven by a piezo electric device to open and close a tap channel rather than a check valve. Other opening and closing expedients are also contemplated, and include mechanical as well chemical means. The frequency, speed, and oscillation action of such and expedient can operate as a control feature of a valvular conduit tap channel, and has applications to other technologies, providing switching at fluidics reservoirs at microsecond speeds.

In certain embodiments, valvular conduit configurations include mirrored parallel symmetric alignment of tap channel, or offset mirror parallel stepped alignment of tap channels, analogous to a step down transformer or a mixing device chemical titration. Another possible configuration is symmetrically directionally opposing-analagous to baseline high and low voltage rails but in this case based on opposing fluid flow and pressure—and provides a "diond" feature.

What is claimed is:

1. A system for conducting material to a well of a microfluidics card, comprising:
   a microfluidics card including:
     one or more wells each having an input channel and an output channel; and
     a fluid circuit including a plurality of microchannels in selective fluid communication with one another, said plurality of microchannels including input and output channels of the one or more wells, an input line, and an output line; and
   a pressure system for selectively applying pressure to fluid in the fluid circuit to direct the fluid in one of multiple possible flow paths in the plurality of microchannels.

2. The system of claim 1, wherein the pressure system includes a plurality of pumps or pistons for establishing pressure differentials.

3. The system of claim 1, wherein the pressure system includes at least one pump and at least one valve.

4. The system of claim 3, wherein the valve is a check valve.

5. The system of claim 3, wherein the vlave is a low pass valve.

6. The system of claim 1, wherein the pressure system includes at least one lipid slug.

7. The system of claim 1, wherein the pressure system includes fluids having differing viscosity and hydrophobic or hydrophilic properties.

8. The system of claim 3, wherein the valve is piezoelectric device.

9. A fluidics processing unit comprising:
   a microfluidics card having an inlet line, an outlet line, and one or more microchannels in fluid communication with the inlet and outlet lines;
   at least one pressure source for driving fluid in the inlet and outlet lines; and
   a controller for actuating the at least one pressure source in a timed sequence of steps to selectively advance at least a portion of the fluid to one or more targeted locations through the microchannels.

10. The fluidics processing unit of claim 9, wherein the at least one of the least one pressure source establishes a pressure differential.

11. The fluidics processing unit of claim 10, further comprising at least a first tesla valvular conduit for establishing the pressure differential.

12. The fluidics processing unit of claim 11, further comprising a second tesla valvular conduit in fluid communication with the first tesla valvular conduit.

13. The fluidics processing unit of claim 10, further comprising using one or more of a check valve or a low pass to establish the pressure differential.

14. The fluidics processing unit of claim 9, wherein at least one of the one or more targeted locations comprises a well containing a chemical or biologic material for interacting with said portion of the fluid.

15. The fluidics processing unit of claim 9, further comprising one or more sensors for providing feedback to the controller.

16. A method for advancing a portion of a fluid in a first microfluidics card comprising:
   providing the first microfluidics card, the card having:
     one or more wells each having an input channel and an output channel; and
     a fluid circuit including a plurality of microchannels in selective fluid communication with one another, said plurality of microchannels including input and output channels of the one or more wells, an input line, and an output line; and
     a pressure system for selectively applying pressure to fluid in the fluid circuit to direct the fluid in one of multiple possible flow paths in the plurality of microchannels;
   establishing a timed sequence of pressure condition events, each pressure condition event in the sequence creating one or more pressure differentials for either imparting to the portion of the fluid a moving force in which the portion is moved from a first to a second location, or establishing an equilibrium in which a position of the portion remains stationary.

17. The method of claim 16, wherein the timed sequence is asynchronous.

18. The method of claim 16, further comprising connecting the first microfluidics card to a second microfluidics card, wherein the first location is in the first microfluidics card and the second location is the second microfluidics card.

19. The method of claim 16, wherein the pressure differential is established using at least one pump and at least one valve.

20. The method of claim 19, wherein the valve is check valve.

21. The method of claim 19, wherein the valve is a low pass valve.

22. The method of claim 16, wherein the pressure differential is established using at least lipid slug.

23. The method of claim 16, wherein the pressure differential is established using fluids having differing viscosity and hydrophobic or hydrophilic properties.

24. The method of claim 19, wherein the valve is piezoelectric device.

* * * * *